(12) United States Patent
Someno et al.

(10) Patent No.: US 7,876,002 B2
(45) Date of Patent: Jan. 25, 2011

(54) ACTUATOR

(75) Inventors: Yoshihiro Someno, Miyagi-ken (JP); Takuya Nagai, Miyagi-ken (JP); Akira Ohki, Iwate-ken (JP); Ikutaro Inoue, Iwate-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 234 days.

(21) Appl. No.: 12/324,466

(22) Filed: Nov. 26, 2008

(65) Prior Publication Data

US 2009/0079275 A1 Mar. 26, 2009

(30) Foreign Application Priority Data

May 31, 2006 (JP) .................................. 206-15114

(51) Int. Cl.
*H02K 41/02* (2006.01)
(52) U.S. Cl. ............... 310/12.22; 310/12.25; 310/12.31; 310/12.24
(58) Field of Classification Search ............... 310/12.22, 310/12.25, 12.31, 12.24
See application file for complete search history.

(56) References Cited

U.S. PATENT DOCUMENTS

2004/0268375 A1 * 12/2004 Someno ..................... 720/696

FOREIGN PATENT DOCUMENTS

| JP | 55-026511 | | 2/1980 |
| JP | 11-325095 | | 11/1999 |
| JP | 2001075031 | A * | 3/2001 |
| JP | 2001-290100 | | 10/2001 |
| JP | 2002112520 | A * | 4/2002 |
| JP | 2002-323039 | | 11/2002 |
| JP | 2004020956 | A * | 1/2004 |
| JP | 2005-308863 | | 11/2005 |
| WO | WO 2007029643 | A1 * | 3/2007 |

OTHER PUBLICATIONS

Machine translation of JP 2002112520 A.*

* cited by examiner

*Primary Examiner*—Quyen Leung
*Assistant Examiner*—Alex W Mok
(74) *Attorney, Agent, or Firm*—Brinks Hofer Gilson & Lione (57) ABSTRACT

An actuator in which, when a supporting shaft, where a mirror (control object) is provided, is tilted by receiving an electromagnetic force of a magnetic driving mechanism, small balls of a supporting mechanism move in an axial direction in a space provided between an outer base and an inner ring member. Therefore, the supporting shaft and the inner ring member holding the supporting shaft swing. At this time, since the inner ring member swings around a rotational fulcrum as center, the supporting shaft can swing around one rotational fulcrum as center at all times. A plurality of laid members serving as a rotation restricting member prevent rotation of the supporting shaft in a direction around the axis.

9 Claims, 11 Drawing Sheets

ACTUATOR

CLAIM OF PRIORITY

This application claims benefit of the Japanese Patent Application No. 2006-151143 filed on May 31, 2006, which is hereby incorporated by reference.

BACKGROUND OF THE INVENTION

1. Field of the Invention

The present invention relates to an actuator having, for example, a mirror mounted to an end of a movable shaft. More particularly, the present invention relates to an actuator that can prevent a rotational fulcrum of a movable shaft from becoming displaced from a tilt center point when the movable shaft is tilted, and that can prevent rotation around the movable shaft.

2. Description of the Related Art

Recording of two-dimensional digital signals onto a holographic recording medium by multiplexing or reproducing of the two-dimensional digital signals from the holographic recording medium by multiplexing is generally performed by changing a wavelength or an angle of incidence of reference light incident upon the recording medium. A typical example of a related actuator that adjusts the angle of incidence of a light beam (reference light) is a galvanometer mirror (refer to, for example, Japanese Unexamined Patent Application Publication No. 2004-271821 (page 6, FIGS. 8 and 9).

Japanese Unexamined Patent Application Publication No. 2004-271821 discusses a biaxial planar galvanometer mirror formed using a semiconductor manufacturing technology. In the galvanometer mirror, an outer frame is supported by a supporting member using a first torsion bar (which forms one shaft), and an inner frame (provided with a mirror) is supported by the outer frame using a second torsion bar (which forms another shaft). When an electromagnetic force is generated at a magnetic driving unit, twisting occurs with the first torsion bar and the second torsion bar serving as centers and disposed orthogonal to each other. Therefore, the outer frame and the inner frame are inclined like seesaws, thereby making it possible to freely change the angle of the mirror.

The supporting means of the galvanometer mirror discussed in Japanese Unexamined Patent Application Publication No. 2004-271821 is what is called a gimbal mechanism, in which the inner frame and the outer frame are independently rotated by the twisting of the first and second torsion bars. Therefore, a support center point of the mirror (control object that is controlled) matches the center of the first torsion bar and the center of the second torsion bar.

However, the support center point with which the two centers match greatly depends upon the precision of individual gimbal mechanisms. Moreover, since the structure makes use of twisting, the support center point varies with each gimbal mechanism, thereby making it difficult to set the center points on the mechanisms at one point.

For example, when reproduction is performed on a holographic recording medium, the hologram recording medium is scanned by swinging reference light while adjusting the mirror in accordance with angles. Here, the support center point corresponds to the center of angle scanning. However, if, as mentioned above, the support center point is not determined, a spot of the reference light is shifted from a predetermined location, thereby generating a read-out error during the scanning.

What is called an Earth-top-type actuator is discussed in Japanese Patent Application No. 2005-259060 previously filed by the applicant and not presented as a prior art document because it has not yet been laid open when filling the application. In this actuator, a movable shaft provided with a mirror is rotatably mounted to a movable ring through a pair of small balls (first small balls). The movable ring is rotatably mounted to a securing base through a pair of small balls (second small balls). The first small balls and the second small balls form two axes that are orthogonal to each other. The mirror can swing around the two axes.

However, although the actuator discussed in Japanese Patent Application No. 2005-259060 is mechanically excellent, it is expensive. Therefore, there is a demand for developing an actuator that is low in cost and that can emulate the function of the actuator discussed in Japanese Patent Application No. 2005-259060.

SUMMARY OF THE INVENTION

The present invention is achieved to overcome the aforementioned related problems, and provides an actuator that can reduce positional displacement of a central portion (support center point) when performing angle scanning.

In addition, the present provides an actuator that makes it possible to reduce costs.

According to the present invention, there is provided a an actuator comprising a control object provided at a movable section side; a supporting shaft supporting the control object; a supporting mechanism provided at a fixed section side, the supporting mechanism swingably supporting the supporting shaft; and a driving mechanism swinging the supporting shaft from a neutral position to a position where the supporting shaft is titled. The supporting mechanism includes an outer base, an inner ring member, and a plurality of small balls, the outer base having an opening and provided at the fixed section side, the inner ring member provided in the opening of the outer base, the plurality of small balls disposed between an inner side of the opening and an outer side of the inner ring member, and the supporting shaft being held by the inner ring member. The driving mechanism includes a magnet, a pair of yokes, and a plurality of driving coils, the magnet provided at either one of the fixed section and the movable section, the yokes disposed at respective poles of the magnet so that the yokes oppose each other, the plurality of driving coils disposed at the other of the fixed section and the movable section, and a plurality of arms extending sideways from one of the yokes and movably disposed in the driving coils.

In the actuator according to the present invention, the supporting shaft is held by the inner ring member of an angular ball bearing, and can swing (tilt) within a range in which the inner ring member can tilt. The periphery of the inner ring member is held by a plurality of small balls rollably disposed between the inner ring member and the inner side of the opening formed in the outer base. Therefore, the supporting shaft and the inner ring member can swing around the angular ball bearing (rotational support (support center point) O) as the center (see, for example, FIG. 1). That is, since, in the actuator, the tilting of the mirror can be changed at all times with respect to one rotational support O as the center, they can swing stably. Consequently, in a hologram reproducing device including such an actuator, it is possible to prevent positional displacement of a spot of reference light from a predetermined position on a recording medium.

It is desirable that a clearance allowing movement of the small balls along a direction of a reference axis be provided between the inner ring member and the outer base.

In the above-described means, since movement in the axial direction of the small balls is allowed, it is possible to tilt the inner ring member.

It is desirable that the inner ring member and the opening in the outer base be both elliptical.

In the above-described means, the center of rotation of the supporting shaft can be brought closer to the rotational fulcrum O. Therefore, axial displacement when the supporting shaft is swinging can be made small.

It is desirable that the actuator further comprise a rotation restricting member restricting rotation of the supporting shaft in a direction around an axis, and provided between the movable section and the fixed section.

In the above-described means, it is possible to restrict the rotation of the inner ring member in a direction around the axis with respect to the outer base. Therefore, in particular, it is possible to prevent variations in the inclination angle of the mirror secured in a tilted orientation with respect to the supporting shaft.

For example, the rotation restricting member may include a plurality of wires laid in a vicinity of the supporting shaft and between the control object and the fixed section.

It is desirable that the rotation restricting member include a securing ring, a driving ring, a restraining ring, a first link, and a second link, the securing ring provided at an outermost periphery of the rotation restricting member, the driving ring provided at an inner side of the securing ring, the restraining ring provided at an innermost periphery of the rotation restricting member, the first link linking the securing ring and the driving ring to each other, the second link linking the driving ring and the restraining ring to each other; and that the securing ring be secured at the fixed section side, and the supporting shaft be held at the center of the restraining ring.

In this case, it is desirable that the first link and second link each be formed in the form of a pair of accordions, and the pair of accordions of the first link be provided 90 degrees from the pair of accordions of the second link.

Alternatively, the rotation restricting member may include a pair of deformation members, a link, and a linking ring, each deformation member having a deformation portion deformable in a first direction, the link being deformable in a second direction perpendicular to the first direction and linking the pair of deformation members to each other, and the linking ring provided at the link. In addition, both ends of each of the deformation members may be secured at the fixed section side, and the supporting shaft may be held at the center of the linking ring.

Even in the above-described means, rotation in a direction around the axis can be restricted on the one hand, and the tilting of the supporting shaft (swinging operation) can be allowed on the other.

For example, the control object may be a mirror.

In the actuator according to the present invention, the supporting shaft can be swung around a predetermined rotational fulcrum (support center point) as center. In addition, it is possible to prevent the mirror from rotating around the supporting shaft.

Therefore, in, for example, a holographic reproducing device using the actuator according to the present invention, it is possible to prevent positional displacement of a spot of light reflected by the mirror. Therefore, it is possible to reduce the number of read-out errors.

DESCRIPTION OF THE PREFERRED EMBODIMENT

Figure 1:
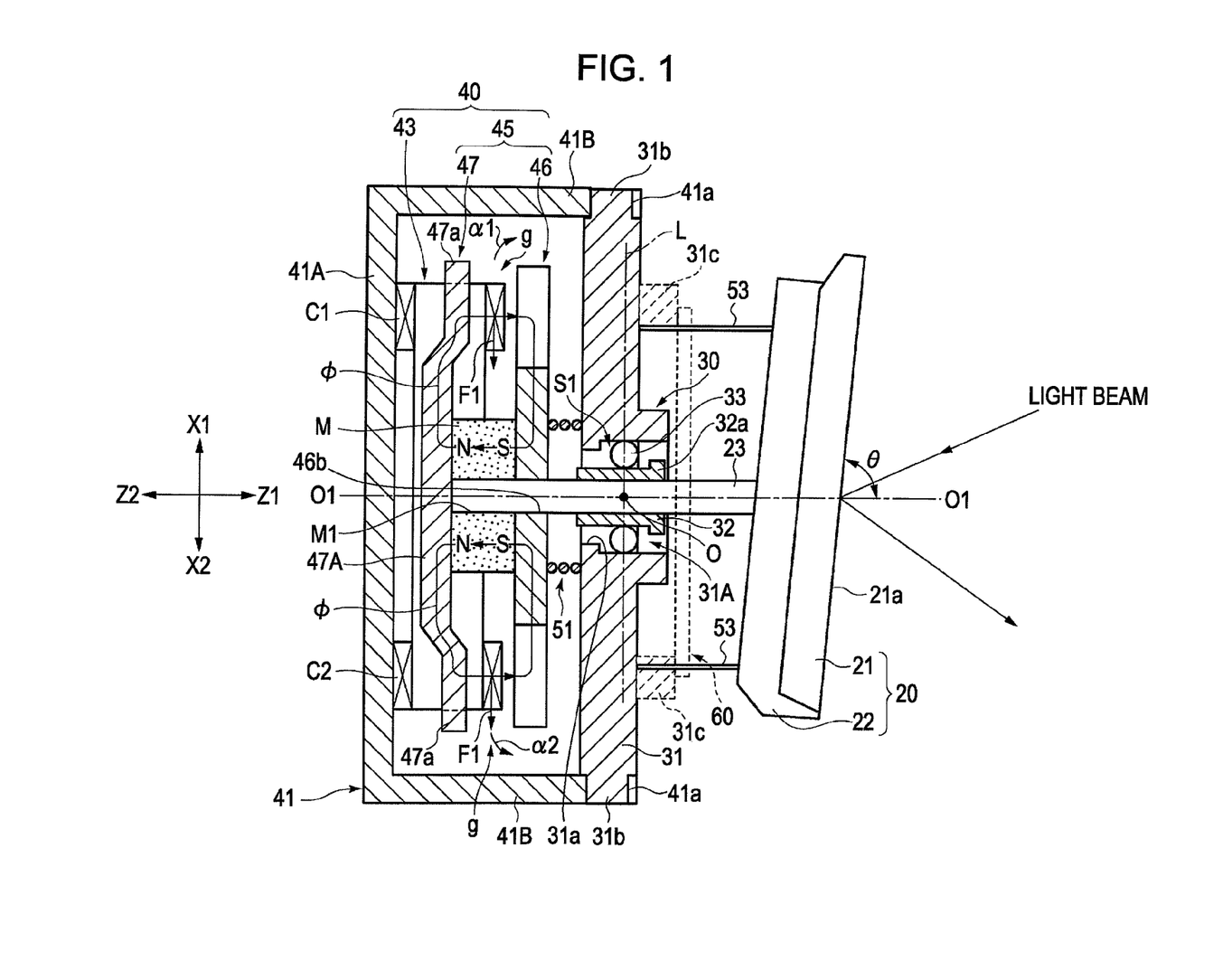
FIG. 1 is a sectional view of a mirror actuator serving as an actuator according to an embodiment of the present invention.
Figure 2:
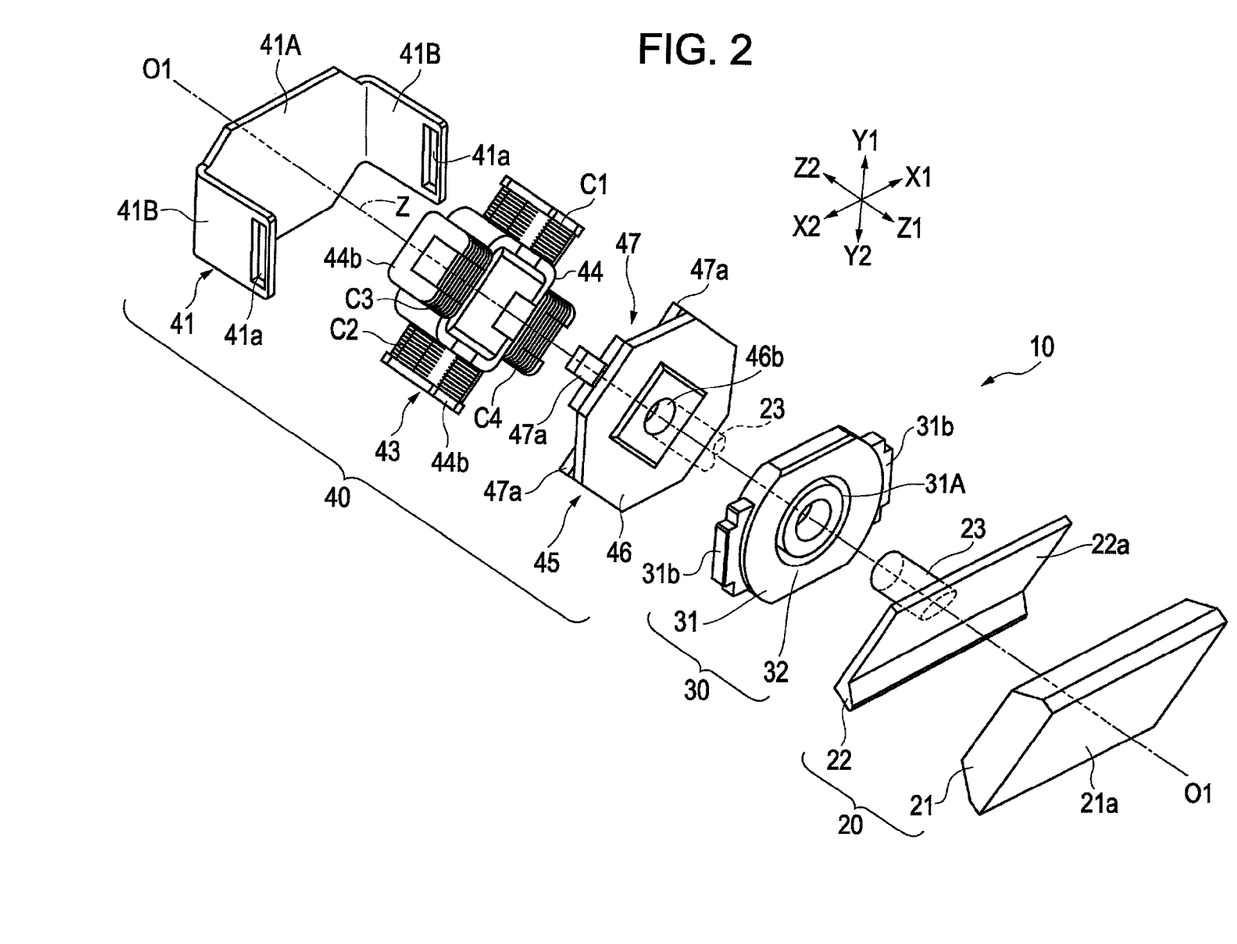
FIG. 2 is a perspective view of the mirror actuator.
Figure 3A:
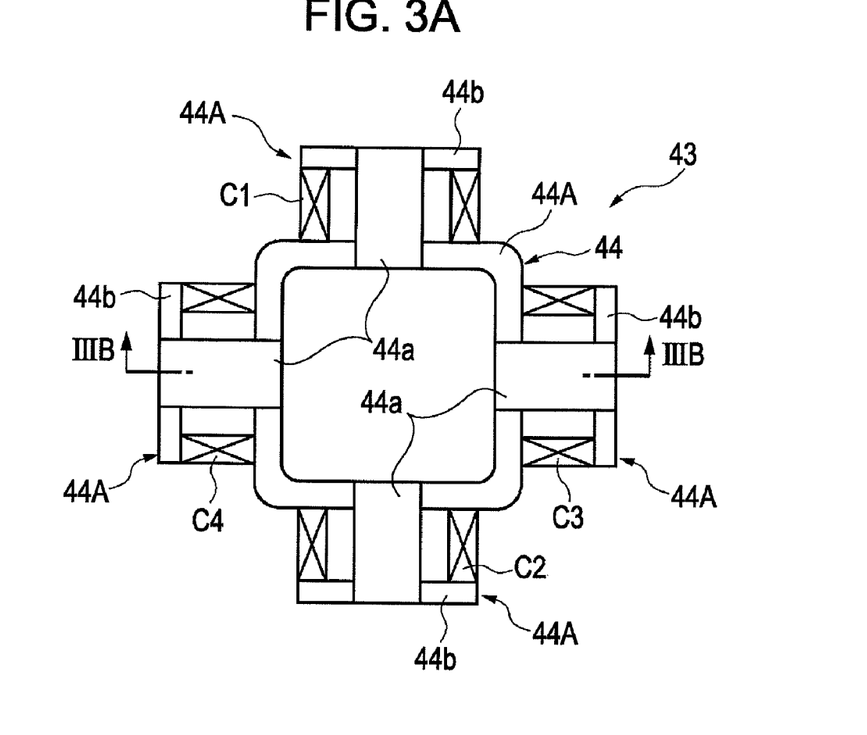
FIG. 3A is a plan view of a bobbin.
Figure 3B:
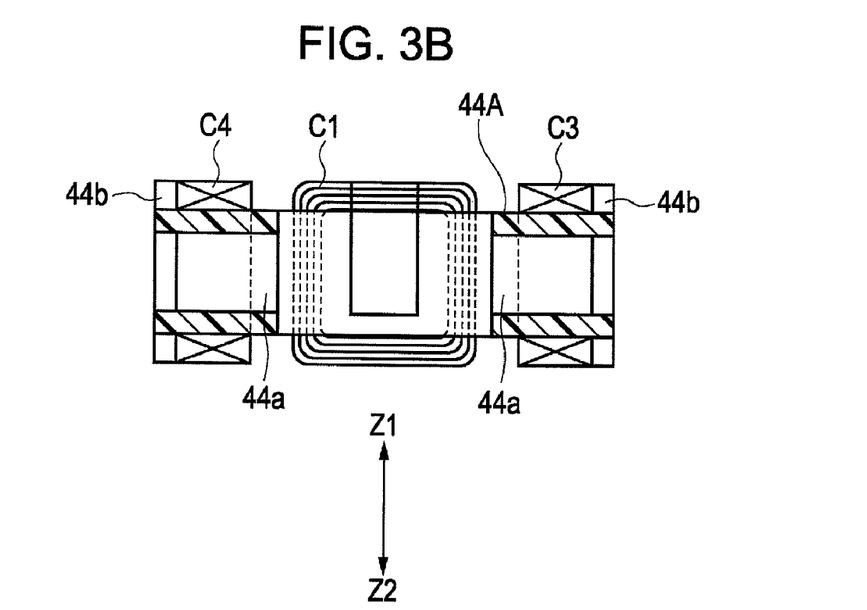
FIG. 3B is a sectional view taken along line IIIB-IIIB of FIG. 3A.
Figure 4:
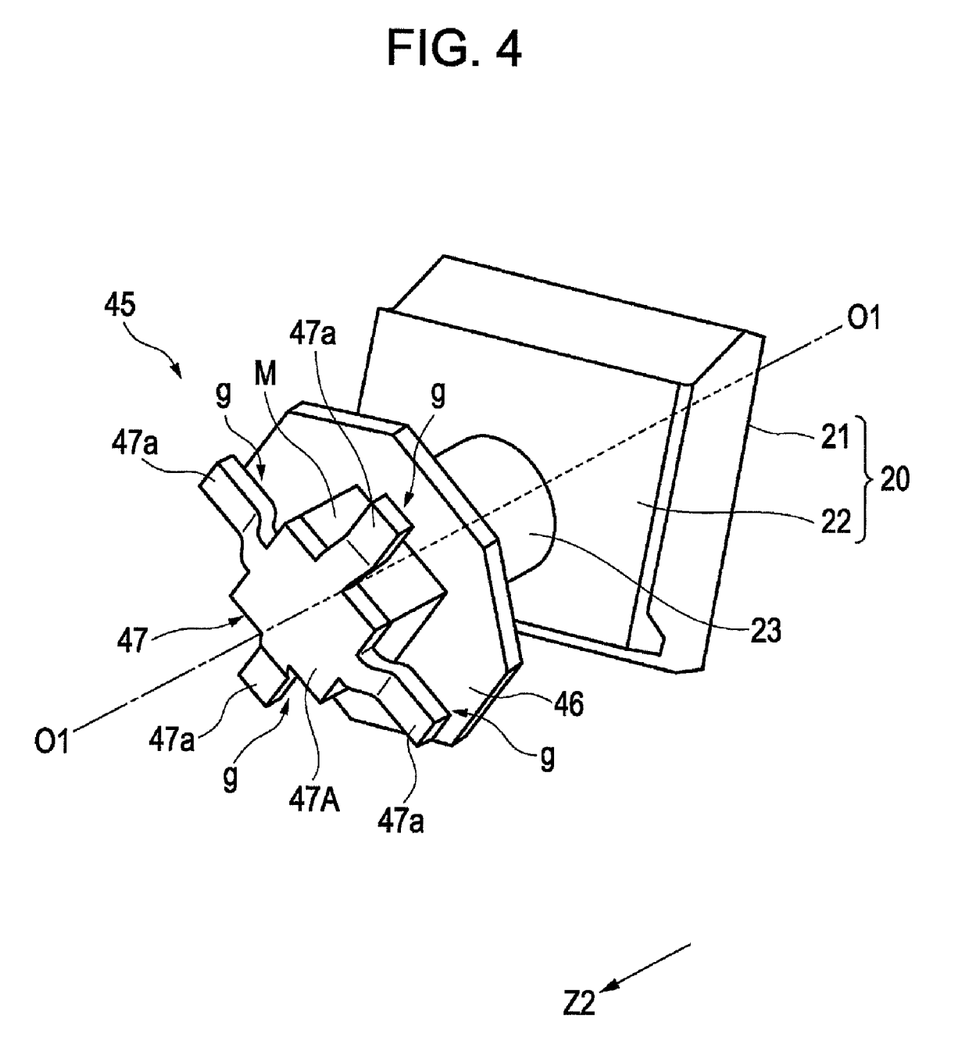
FIG. 4 is a perspective view of a magnetic-field generating unit as seen from a direction that differs from that in which it is seen in FIG. 2.
Figure 5:
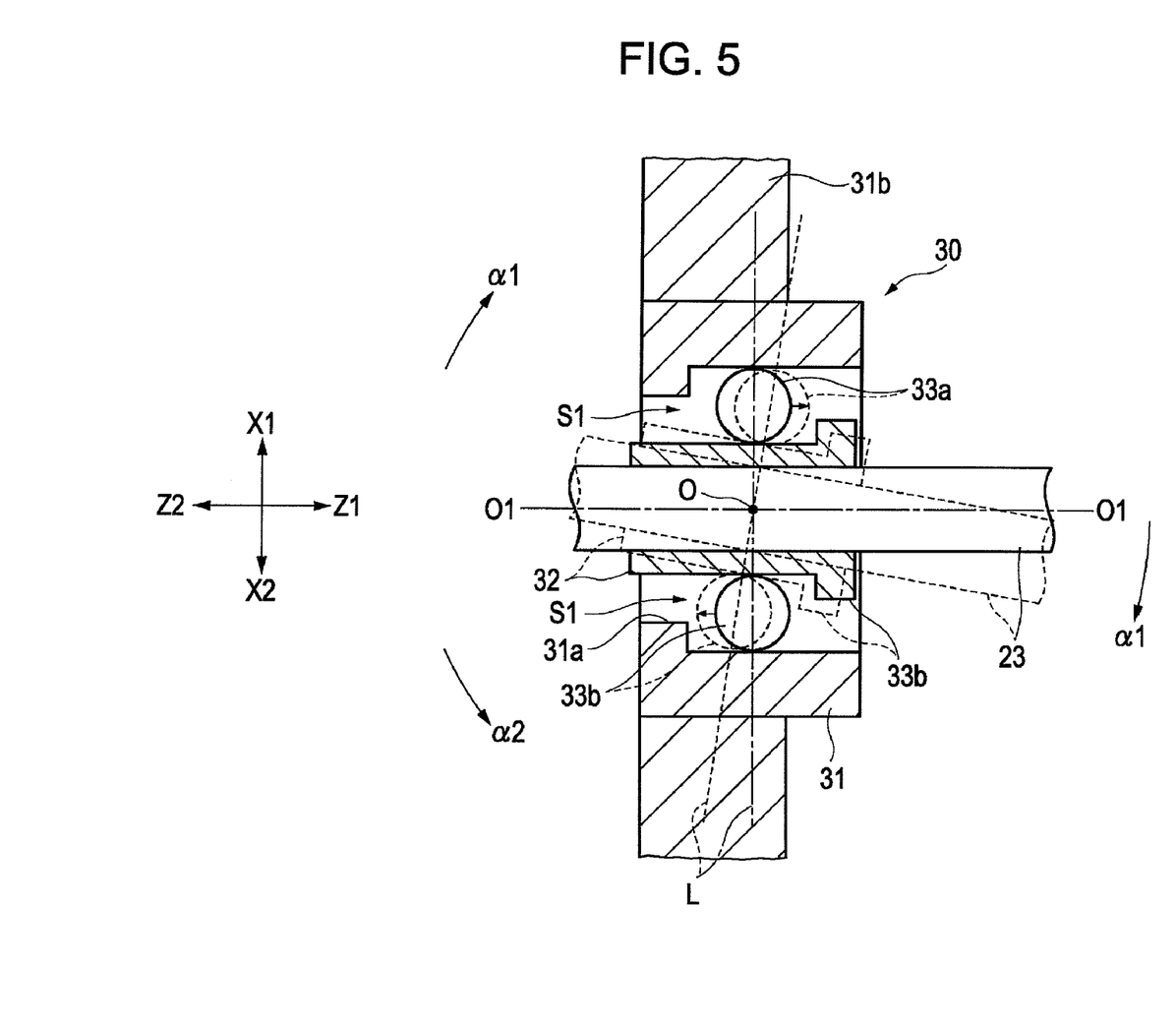
FIG. 5 is an enlarged sectional view of a supporting mechanism, showing an operation state of the mirror actuator.

FIG. 1 is a sectional view of a mirror actuator serving as an actuator according to an embodiment of the present invention. FIG. 2 is a perspective view of the mirror actuator. FIG. 3A is a plan view of a bobbin. FIG. 3B is a sectional view taken along line IIIB-IIIB of FIG. 3A. FIG. 4 is a perspective view of a magnetic-field generating unit as seen from a direction that differs from that in which it is seen in FIG. 2. FIG. 5 is an enlarged sectional view of a supporting mechanism, showing an operation state of the mirror actuator.

The mirror actuator described below is mounted to an optical-recording-medium reproducing device (holographic reproducing device), which makes use of a hologram and which has been considerably developed in recent years. That is, a mirror actuator 10 is used as a device that adjusts the angle of incidence of laser light with respect to any recording position (book) of an optical recording medium when the laser light emitted from a light source illuminates the any recording position. In the holographic reproducing device, a hologram (page) recorded in accordance with angles is read out by driving the mirror actuator in small angle steps.

The mirror actuator 10 according to the embodiment roughly comprises three members, that is, a mirror 20 (control object that is controlled), a supporting mechanism 30, and a magnetic driving mechanism 40. Each of these will hereunder be described in detail.

The mirror (control object) 20 comprises a total-reflection mirror body 21 and a stage 22 to which the mirror body 21 is mounted. A supporting shaft 23 extending in a Z2 direction is integrally formed with a back surface (Z2-side surface) of the stage 22.

In this embodiment, the supporting shaft 23 is shown so as to be aligned with a predetermined reference axis O1-O1. The stage 22 is tilted with respect to the supporting shaft 23. Therefore, a reflecting surface 21a of the mirror body 21 is not set at right angles to the reference axis O1-O1, but is set at a predetermined inclination θ.

The supporting shaft 23 is supported by the supporting mechanism 30. The supporting mechanism 30 is what is called an angular ball bearing. That is, the supporting mechanism 30 has an outer base 31, provided at the outer side thereof, and an inner ring member 32, provided at the inner side thereof.

The outer base 31 has an opening 31A at its center extending through the outer base 31 in an illustrated Z direction. Securing portions 31b and 31b protruding in an illustrated X1 direction and an illustrated X2 direction are provided at respective X-direction ends of the outer base 31. The inner ring member 32 is an annular member.

As shown in FIG. 1, the outer base 31 is secured to a securing member 41. The securing member 41 is formed of, for example, a substantially C-shaped metallic plate or synthetic resin plate. In addition, the securing member 41 has a bottom surface 41A and side walls 41B and 41B continuously extending from respective ends of the bottom surface 41A in an illustrated Z1 direction. Elongated holes 41a and 41a extending in a Y direction are formed in respective ends of the respective side walls 41B and 41B so as to extend therethrough in the illustrated X direction. The securing portions 31b and 31b of the outer base 31 are fitted to the elongated holes 41a and 41a, respectively.

In the embodiment shown in FIG. 1, a first step 31a is formed in an illustrated Z2-side inner surface of the opening 31A formed in the outer base 31. A second step 32a opposing the first step 31a is formed at the outer side at a Z1 side of the inner ring member 32. A plurality of small balls 33, arranged in parallel in a direction around the axis (peripheral direction), are disposed in a space S1 where the inner surface of the outer base 31 and the outer surface of the inner ring member 32 oppose each other in a radial direction.

A widthwise dimension in an axial direction (Z direction) of the space S1, that is, the distance in the axial direction (Z direction) in which the first step 31a and the second step 32a oppose each other is slightly larger than the diameter of each small ball 33. Therefore, a slight clearance that allows the small balls 33 to move in the axial direction is provided in the space S1.

The supporting shaft 23 is press-fitted to the inner side of the inner ring member 32, and is integrally formed with the inner ring member 32.

Here, as shown in FIG. 1, in a state in which no force acts upon the supporting shaft 23, a plane including the center point of the plurality of small balls 33 and being orthogonal to the reference axis O1-O1 is defined as an imaginary plane L. A point where the imaginary plane L intersects with the reference axis O1-O1 is defined as a rotational fulcrum (support center point) O.

For example, when a rotational force in an α1 direction or an α2 direction around the rotational fulcrum O as center in FIG. 1 is generated at the inner ring member 32, as shown in FIG. 5, the plurality of small balls 33 roll primarily in the axial direction (Z direction) in the space. Therefore, the supporting shaft 23 can be tilted with respect to the rotational fulcrum O as center.

The states of the imaginary plane L, the small balls 33, and the supporting shaft 23 after being tilted are indicated by dotted lines in FIG. 5.

In the supporting mechanism 30 according to the embodiment, when rotation occurs in a direction around the reference axis O1-O1, the small balls 33 roll in the direction around the axis in the space. Therefore, the supporting shaft 23 and the inner ring member 32 are allowed to rotate together in the direction around the axis.

The magnetic driving mechanism 40 primarily includes a coil 43 and a magnetic-field generating unit 45.

As shown in, for example, FIGS. 3A and 3B, the coil 43 includes a bobbin 44 having a substantially cross shape in a plane and formed of, for example, a resin material. The bobbin 44 has a rectangular frame 44A and four cylindrical winding portions 44B, 44B, 44B, and 44B. The rectangular frame 44A is provided at the central portion of the bobbin 44. The four cylindrical winding portions 44B, 44B, 44B, and 44B protrude in respective four directions from the outer peripheral surface of the frame 44A. Communicating portions 44a, 44a, 44a, and 44a extending through the winding portions 44B, 44B, 44B, and 44B from the inner portion of the frame 44A are formed in the outer peripheral surface of the frame 44A. Flanges 44b, 44b, 44b, and 44b, which widen perpendicularly to the four directions in which the winding portions 44B extend, are integrally formed at respective ends of the respective winding portions 44B. Four coil portions C1, C2, C3, and C4 are formed at the outer peripheries of the respective winding portions 44B by winding wire rods between the outer periphery of the frame 44A and the flanges 44b. The bobbin 44 provided with the four coil portions C1, C2, C3, and C4 are secured to the bottom surface 41A of the securing member 41.

As shown in FIG. 1, the magnetic-field generating unit 45 comprises a first yoke 46, a permanent magnet M, and a second yoke 47. The first yoke 46 is formed of a metallic plate (formed of a soft magnetic material), such as a galvanized steel sheet iron plate (SPCC). The metallic plate is an octagonal plate that is wider than the base area of the permanent magnet M. The first yoke 46 according to this embodiment has a through hole 46b formed at its central portion so as to extend therethrough in a plate thickness direction.

The permanent magnet M is secured to a central portion in an illustrated Z2-side surface of the first yoke 46. The permanent magnet M is magnetized in a planar direction so that, for example, a Z1 side is an S pole and the Z2 side is an N pole. A through hole M1 is formed in the central portion of the permanent magnet M in the embodiment so as to extend therethrough along the reference axis O1-O1. The permanent magnet M may have a cubic shape as in the embodiment, or may have an annular shape with a hole in its center.

As shown in FIG. 4, the second yoke 47 is also formed of a soft magnetic material similarly to the first yoke 46. The second yoke 47 has a rectangular body 47A and four arms 47a, 47a, 47a, and 47a. The body 47A has an area that is substantially the same as that of the permanent magnet M. The four arms 47a, 47a, 47a, and 47a extend in four respective directions from four respective side surfaces of the body 47A. The four arms 47a, 47a, 47a, and 47a are each bent at one end in the direction approaching the first yoke 46 (Z1 direction). Gaps g are provided between the first yoke 46 and the ends of the respective arms 47a, 47a, 47a, and 47a.

The second yoke 47 is formed by processing a sheet metal. For example, it is possible to form the second yoke 47 as follows. Using a predetermined die, the second yoke 47 having a rectangular body 47A and arms 47a, 47a, 47a, and 47a (disposed around the body 47A) may be cut out (punched out) from the metallic plate while they are in an integrated state. Then, only ends of the arms 47a, 47a, 47a, and 47a may be bent by pressing.

The second yoke 47 is secured with an adhesive provided between a lower surface (Z1-side surface) of the body 47A and an upper surface (Z2-side surface) of the permanent magnet M.

In the embodiment, an end of the supporting shaft 23 is inserted into the through hole 46b of the first yoke 46 and the through hole M1 of the permanent magnet M, and is secured to a Z1-side end of the second yoke 47. However, it is possible to directly secure the end of the supporting shaft 23 to a Z1-side end of the first yoke 46 without providing the first yoke 46 with the through hole 46b and the permanent magnet M with the through hole M1.

In the embodiment, the second yoke 47 is disposed in the bobbin 44. That is, the body 47A of the second yoke 47 is disposed in the frame 44A of the bobbin 44, and the arms 47a, 47a, 47a, and 47a extending from the second yoke 47 are inserted in the communication portions 44a. In addition, the ends of the respective arms 47a, 47a, 47a, and 47a are disposed while being movable in the respective coil portions C1, C2, C3, and C4, and oppose the first yoke 46. In this state, the coil portions C1, C2, C3, and C4 are disposed in the opposing gaps g.

The frame 44A and the four winding portions 44B, 44B, 44B, and 44B of the bobbin 44 may be separately formed. In this case, the coil portions C1, C2, C3, and C4 are formed by previously winding wire rods around the respective winding portions 44B, and the permanent magnet M and the second yoke 47 are mounted in the frame 44A. Thereafter, the winding portions 44B, 44B, 44B, and 44B provided with the respective coils C1, C2, C3, and C4 are secured to the four respective outer peripheral surfaces of the frame 44A so as to surround the respective arms 47a protruding outwardly of the frame 44A through the communication portions 44a. This makes it possible to form the bobbin 44 having the four coil portions C1, C2, C3, and C4 integrally provided.

A biasing member 51 comprising, for example, a compression spring that generates restoring force which returns the orientation of the supporting shaft 23 to its original state (that is, a state in which it is aligned with the reference axis O1-O1) is provided between the outer base 31 and a Z1-side surface of the first yoke 46.

Further, in the present invention, a rotation restricting member is provided between a movable section and a fixed section.

The rotation restricting member comprises laid members 53 (four in the embodiment) that are symmetrically provided around the reference axis O1-O1. In the embodiment, the laid members 53 are laid while a predetermined tension is applied between the back surface (Z2-side surface) of the stage 22 (forming the movable section) and the outer base 31 (forming the fixed section).

The operation of the mirror actuator will be described.

As shown in FIG. 1, the ends of the respective arms 47a oppose the first yoke 46 through the gaps g, and portions of the four respective coil portions C1, C2, C3, and C4 are disposed in the respective gaps g. In FIG. 1, the coil portions C1 and C2 (first magnetic driving section) are only shown.

In the magnetic-field generating unit 45, a magnetic flux φ generated from the N pole of the permanent magnet M advances in an outer peripheral direction in the body 47A in the second yoke 47 so as to be directed away from the center, and is guided to the arms 47a. Then, the magnetic flux φ travels to the outside from lower surfaces (Z1-side surfaces) of the ends of the respective arms 47a, passes through the gaps g (provided so as to oppose the arms 47a), and enters the first yoke 46. Further, a magnetic circuit in which the magnetic flux φ travels in the first yoke 46 towards the center, and reaches the S pole of the permanent magnet M, is formed. Then, when the magnetic flux φ passes through the gaps g, the magnetic flux φ perpendicularly links with electrical current flowing through the coil portions C1, C2, C3, and C4.

Here, in the magnetic driving mechanism 40, the coil portions C1 and C2, disposed axially symmetrically with respect to the reference axis O1-O1, form the first magnetic driving unit, and the coil portions C3 and C4 similarly form a second magnetic driving unit.

When electrical current of a predetermined direction flows through the coil portions C1 and C2 (forming the first magnetic driving unit), electromagnetic forces F1 and F1 are generated in the coil portion C1 in accordance with Fleming's left-hand rule. The electromagnetic forces F1 and F1 act as rotational forces with respect to the supporting shaft 23 (provided perpendicularly to the lower surface of the first yoke 46 forming the magnetic-field generating unit 45) in an α1 direction and an α2 direction around the predetermined support center point (rotational fulcrum) O as center.

Here, as shown in FIG. 5, the small balls 33a, provided in the supporting mechanism 30, move in one axial direction (for example, the Z1 direction) in the space S1. At the same time, the small balls 33b move in another axial direction (for example, the Z2 direction) in the space S1. At this time, the small balls 33a and the small balls 33b move in opposite directions through the same distance. The distance through which the small balls 33a and the small balls 33b move is within a range of a slight clearance in the space S1. Therefore, the inner ring member 32 can swing along with the supporting shaft 23 around the rotational fulcrum O as center. That is, the center around which the supporting shaft 23 swings can be set at one point (that is, the rotational fulcrum O), and an inclination angle θ of the mirror 20 (control object to be controlled) can be stably changed.

Therefore, in the holographic reproducing device, when a light beam emitted from a light source is reflected by the mirror actuator to form reference light, it is possible to prevent a spot of the reference light from shifting from a predetermined position. That is, the position of the spot of the reference light can be set at a predetermined position at all times. Consequently, in such a hologram reproducing device, it is possible to reduce the number of read-out errors.

The above-described relationship also holds for the coil portions C3 and C4 forming the second magnetic driving unit. That is, changing the direction of electrical current flowing through the coil portions C3 and C4 makes it possible to freely tilt the supporting shaft in a direction orthogonal to the α1 direction and the α2 direction.

Therefore, when the directions of the electrical currents flowing through the coil portions C1 and C2 (forming the first magnetic driving unit) and the coil portions C3 and C4 (forming the second magnetic driving unit) are set in predetermined directions, the supporting shaft 23 can be freely tilted in a predetermined direction from the orientation of the supporting shaft 23 aligned with the reference axis O1-O1.

FIG. 5 is a sectional view of a plane where the electromagnetic forces F1 and F1 (the rotational forces) are generated, and the small balls 33a and the small balls 33b are axially symmetrically provided with respect to the reference axis O1-O1.

Figure 6:
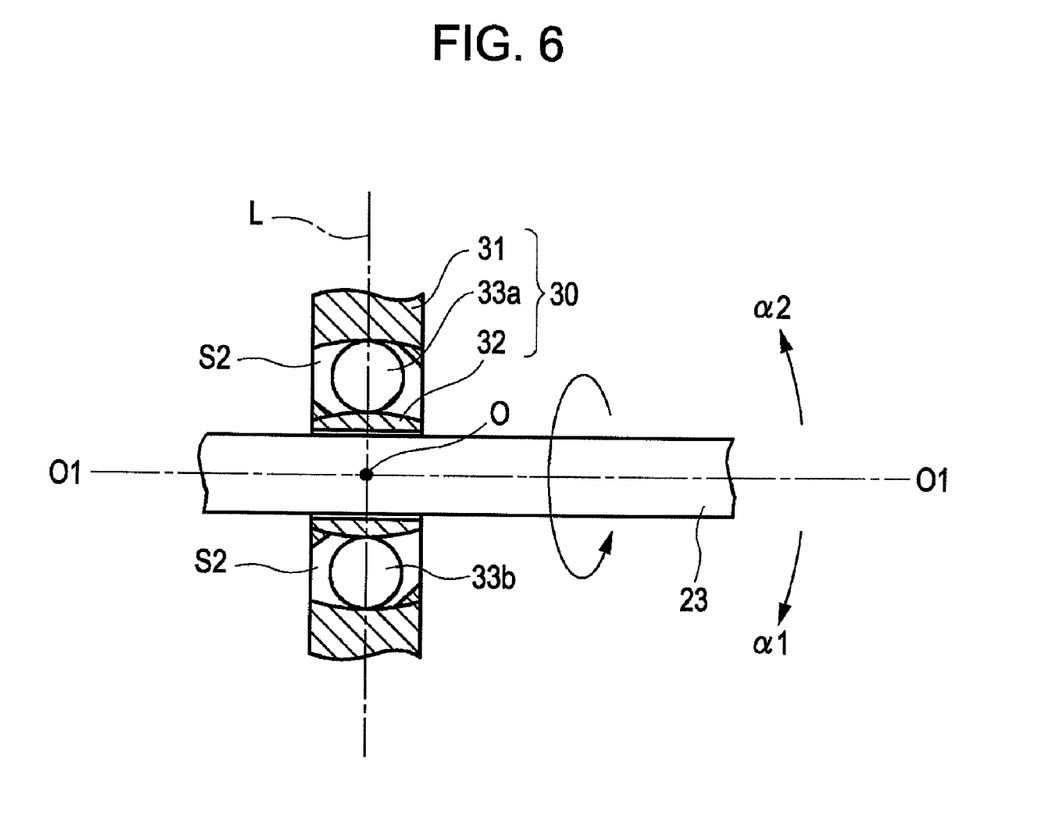
FIG. 6 is a sectional view of another structure of the supporting member.

The supporting mechanism 30 may have a structure such as that shown in FIG. 6.

FIG. 6 is a sectional view of another structure of the supporting member.

The structure shown in FIG. 6 differs in that the inner surface of the outer base 31 is a recessed curved surface and that the outer surface of the inner ring member 32 opposing the curved surface is a protruding curved surface. It is desirable that the inner surface of the outer base 31 and the outer surface of the inner ring member 32 have predetermined curvatures with the rotational fulcrum O as center.

In this structure, when the supporting shaft 23 swings, the small balls 33a and the small balls 33b move in opposite directions along an arc (with the rotational fulcrum O as center) in a space S2 where the recessed surface and the protruding surface oppose each other. Therefore, the center around which the supporting shaft 23 swings can be brought closer to the rotational fulcrum O.

When, by a similar principle, the direction of the electrical currents flowing through the coil portions C1 and C2 is changed, the magnetic-field generating unit 45 can be tilted (swung) in the α2 direction that is opposite to the α1 direction.

When the supporting shaft 23 is tilted, the biasing member 51, provided between the first yoke 46 and the outer base 31, is deformed. The biasing member 51 always generates a restoring force that tries to restore it to its original state. Therefore, by blocking drive current applied to the coil portions C1, C2, C3, and C4, and causing the electromagnetic forces F1 and F1 to disappear, the supporting shaft 23 can be restored from its tilted orientation to its original orientation which is aligned with the reference axis O1-O1.

In the supporting mechanism 30 according to the embodiment, when a rotation occurs around the reference axis O1-O1, the small balls 33 roll around the reference axis O1-O1 in the space. Therefore, the supporting shaft 23 and the inner ring member 32 are allowed to rotate together around the reference axis O1-O1.

However, when the supporting shaft 23 rotates around the axis, the inclination angle of the mirror body 20 mounted in a tilted orientation to an end of the supporting shaft 23 changes. Therefore, it is necessary to restrict the rotation of the supporting shaft 23 around the axis.

Accordingly, in the present invention, the laid members 53 are laid between the fixed section and the movable section as shown in FIG. 1.

Figure 7A:
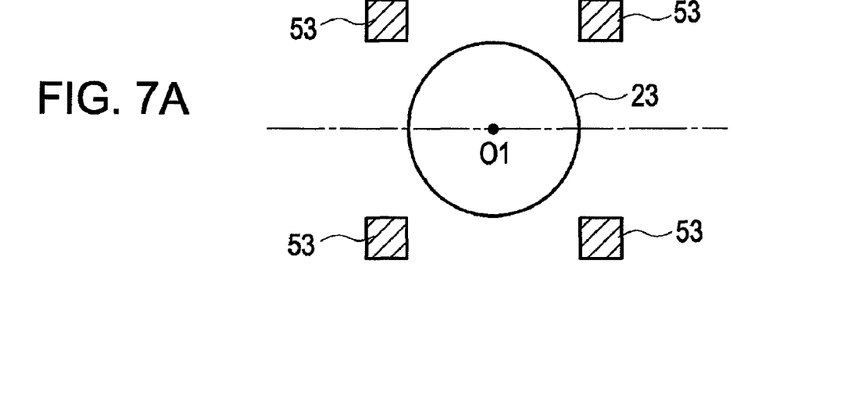
FIG. 7A is a plan view of a rotation restricting member according to a first example, in which four laid members are in a stationary state.
Figure 7B:
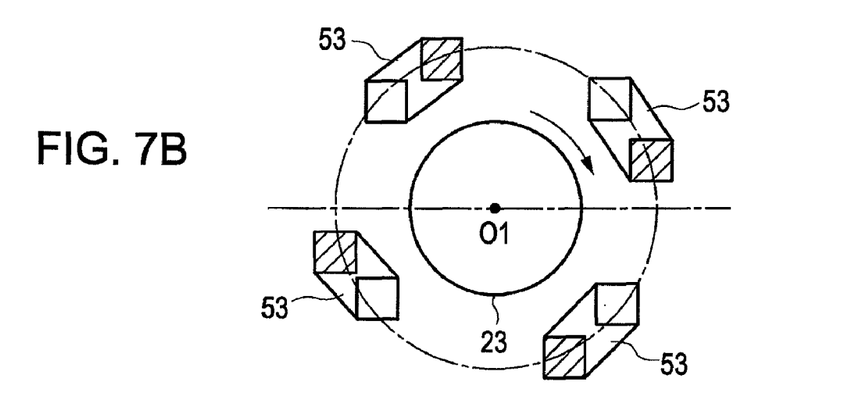
FIG. 7B is a plan view of the four laid members in a rotated state.
Figure 7C:
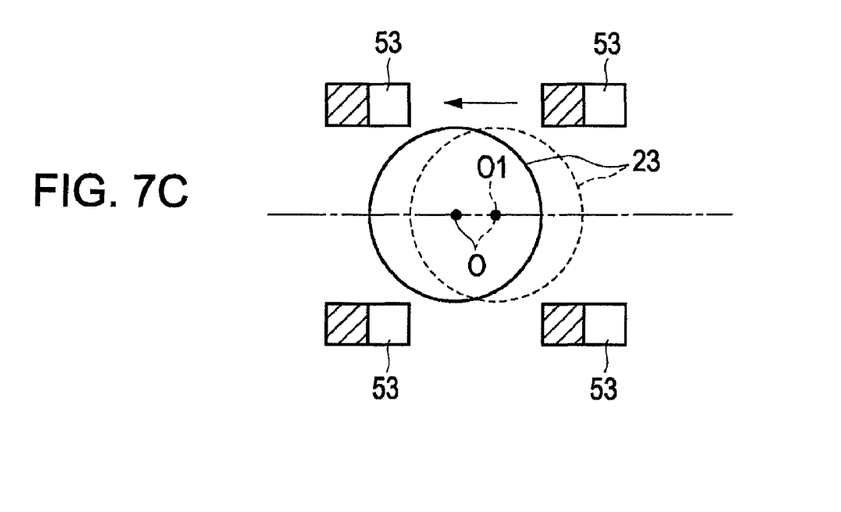
FIG. 7C is a plan view of a state of the four laid members swung in one direction.

FIGS. 7A to 7C are plan views of the operations of the rotation restricting member according to a first example. FIG. 7A shows a state in which the four laid members are in a stationary state. FIG. 7B shows a state in which the four laid members are in a rotated state. FIG. 7C shows a state in which the four laid members are swung in one direction. In FIGS. 7A to 7C, the hatched portions indicate the upper surfaces of the respective laid members, and the unhatched portions indicate the lower surfaces of the respective laid members.

The laid members 53 are formed of, for example, metal wires having excellent flexibility. Accordingly, when the laid members 53 to which tension is applied are laid between the movable section and the fixed section, it is possible to restrict rotation around a rotational axis.

The laid members 53 may be circular in cross section, but desirably have square shapes in cross section as shown in FIGS. 7A to 7C. Accordingly, in the wires having square shapes in cross section, a vertical elastic modulus in a direction parallel to each plane in the vicinity is greater than that in, for example, wires that are circular in cross section. Therefore, in the above-described structure, the laid members 53 can be highly resistant to twisting deformation. Consequently, as shown in FIG. 7B, even if a certain force acts upon the supporting shaft 23 in a direction around the axis, the laid members 53 resist the force acting in the direction around the axis. Thus, even if an external force is generated at the supporting shaft 23 in the direction around the axis, it is possible to essentially prevent the supporting shaft 23 from rolling around the axis.

As shown in FIG. 7C, when the supporting shaft 23 swings from its state (indicated by dotted lines) in which the rotational fulcrum O of the supporting shaft 23 is aligned with the reference axis O1-O1 to its state (indicated by a solid line) that is displaced from the state indicated by dotted lines, the laid members 53 are not twisted. Therefore, when the supporting shaft 23 swings, the resistance force acting upon the supporting shaft 23 from the laid members 53 is small. Consequently, the supporting shaft 23 and the inner ring member 32 can be easily tilted.

That is, the laid members 53 function as a rotation restricting member that restricts rotation in the direction around the axis on the one hand, and allows the supporting shaft 23 and the inner ring member 32 to swing on the other.

Next, a rotation restricting member according to a second example will be described.

Figure 8:
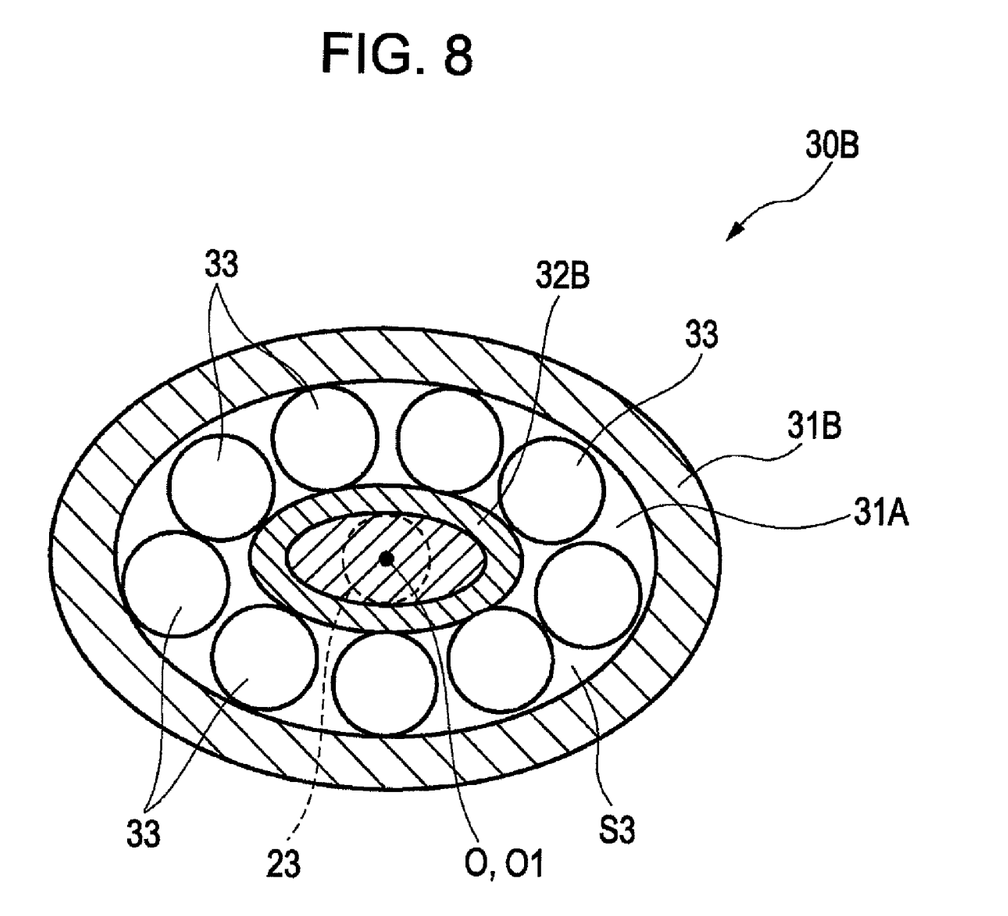
FIG. 8 is a plan view of a rotation restricting member according to a second example.

FIG. 8 is a plan view of the rotation restricting member according to the second example. In this embodiment, a supporting member has a rotation restricting function.

A supporting mechanism 30B according to the example has an outer base 31B and an inner ring member 32B. The outer base 31B has an elliptical opening 31A at the inner side thereof. The inner ring member 32B has an elliptical external shape. The inner ring member 32B is disposed in the opening 31A. A plurality of small balls 33 are disposed between the inner surface of the outer base 31B (inner surface of the opening 31A) and the outer surface of the inner ring member 32B, and along a direction around the axis in a space S3 formed like an elliptical strip in plan view.

The supporting shaft 23 is secured while inserted in the inner ring member 32B. The other structural features are similar to those of the supporting mechanism 30.

In the example, when the supporting shaft 23 rotates around the axis (the reference axis O1-O1), the rotation acts so that a long axis of the inner ring member 32B matches a short axis of the opening 31A (or so that a short axis of the inner ring member 32B matches a long axis of the opening 31A).

However, when an attempt is made to cause the long axis of the inner ring member 32B to match the short axis of the opening 31A, a distance in a portion of the space where the component parts oppose each other becomes smaller than the diameter of the small balls 33. Therefore, a free movement of the small balls 33 in a direction around the axis is limited. Consequently, in the supporting mechanism 30B, free rotation of the inner ring member 32B can be limited. That is, the supporting mechanism 30B has a rotation restricting function that restricts the rotation of the supporting shaft 23 in the direction around the axis.

The supporting shaft 23 can freely swing (tilt) with respect to the reference axis O1-O1 without any particular restrictions similarly to the case mentioned above.

That is, the supporting mechanism 30B functions as a rotation restricting member that restricts rotation in a direction around the axis. In addition, the supporting mechanism 30B allows the supporting shaft 23 and the inner ring member 32 to swing.

Even in this case, similarly to the case mentioned above, it is desirable that the inner surface of the outer base 31B and the outer surface of the inner ring member 32B have predetermined curvatures with the rotational fulcrum O as center (that is, it is desirable that the structure shown in FIG. 6 be used).

Figure 9A:
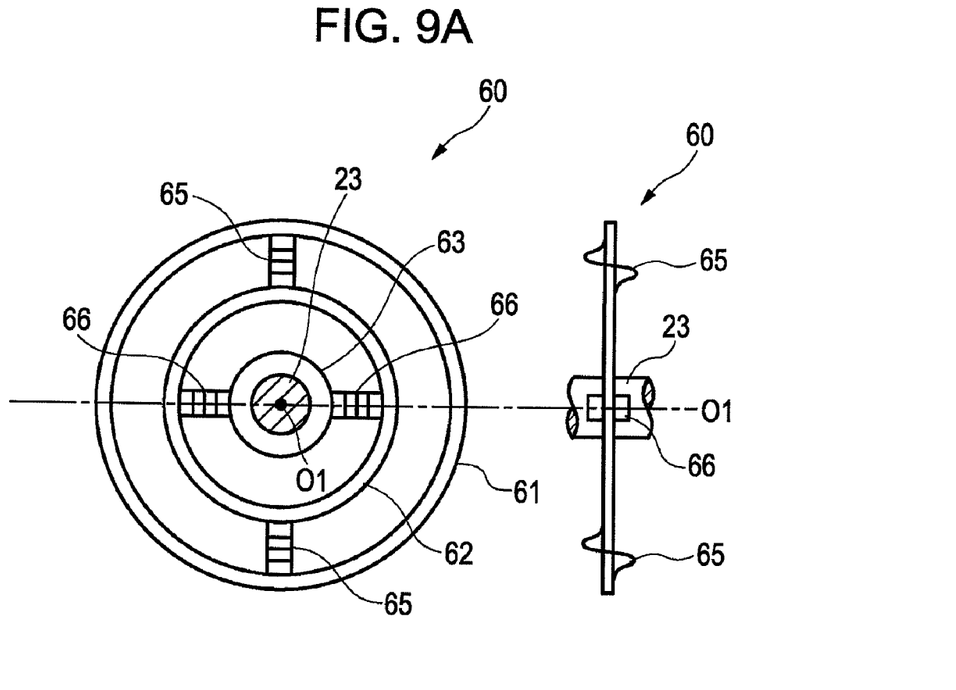
FIG. 9A is a plan view and a side view of a rotation restricting member according to a third example, in which a supporting shaft is at a neutral position.
Figure 9B:
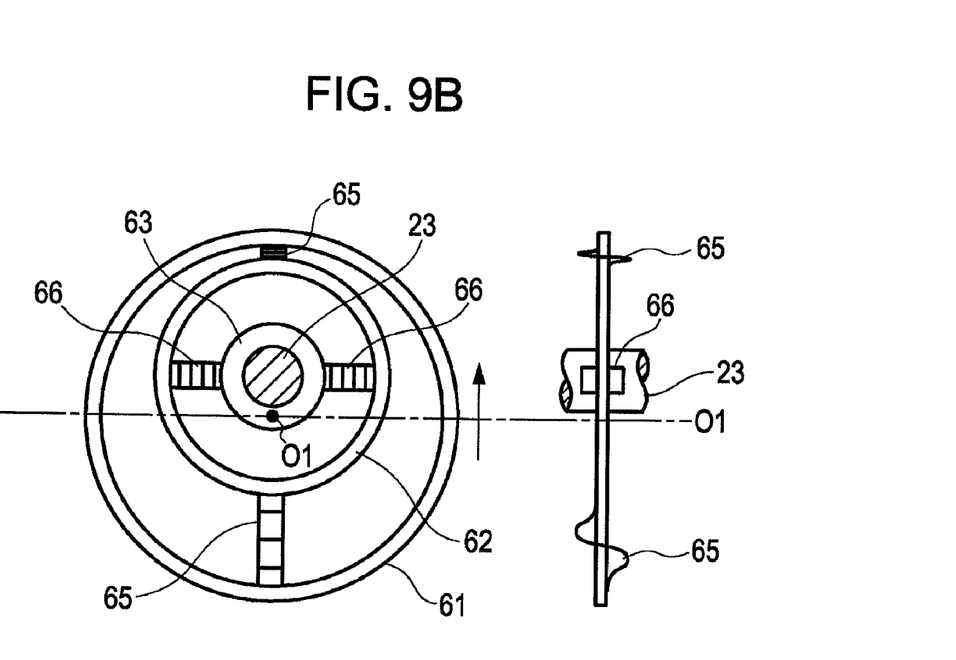
FIG. 9B is a plan view and a side view of a state of the rotation restricting member after the supporting shaft has swung.
Figure 10:
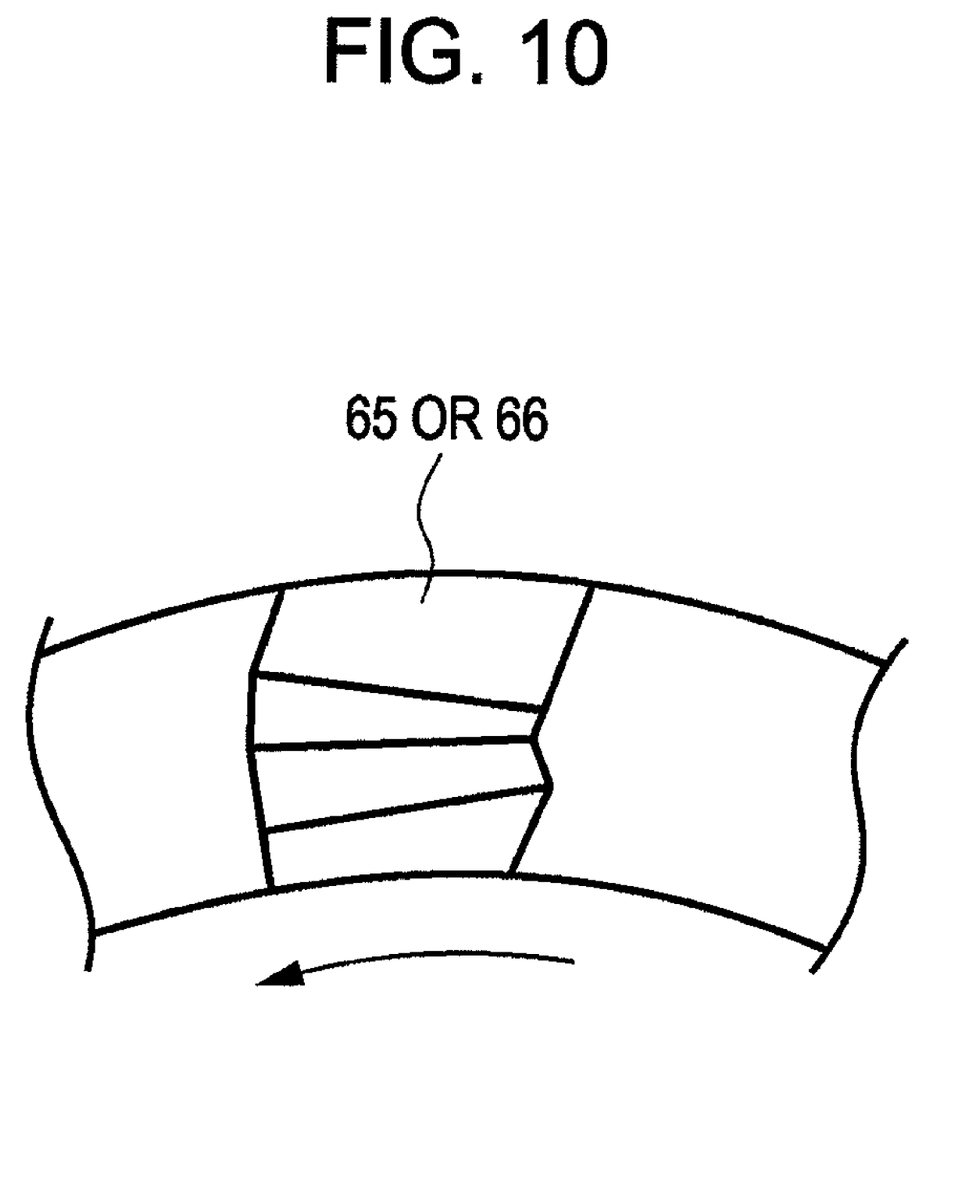
FIG. 10 is a schematic view of a state in which a link of the rotation restricting member is twisted by rotation.

FIGS. 9A and 9B are plan views and side views of a rotation restricting member according to a third example. FIG. 9A shows a state in which the supporting shaft is at a neutral position. FIG. 9B shows a state after the supporting shaft has swung. FIG. 10 is a schematic view of a state in which a link of the rotation restricting member is twisted by rotation.

A rotation restricting member 60 according to the third example can be provided at, for example, the supporting mechanism 30 formed at the fixed section side (refer to dotted lines in FIG. 1). As shown in FIGS. 9A and 9B, the rotation restricting member 60 according to this example comprises three annular members having different diameters and two types of links that link the three annular members to each other.

The annular members comprise a securing ring 61, provided at the outermost periphery, a driving ring 62, provided at the inner side of the securing ring 16, and a restraining ring 63, provided at the innermost periphery. In the state shown in FIG. 9A, the securing ring 61, the driving ring 62, and the restraining ring 63 are substantially concentrically formed.

The links comprise a pair of first links 65 and 65 and a pair of second links 66 and 66. The first links 65 and 65 link the securing ring 61 and the driving ring 62 to each other. The second links 66 and 66 link the driving ring 62 and the restraining ring 63 to each other. In the embodiment, the first links 65 and 65 and the second links 66 and 66 have the form of accordions.

The first links 65 are symmetrically formed with respect to the reference axis O1-O1 as center so as to be positioned 180 degrees apart from each other. Similarly, the second links 66 are symmetrically formed with respect to the reference axis O1-O1 as center so as to be positioned 180 degrees apart from each other. The first links 65 and 65 and the respective second links 66 and 66 are formed 90 degrees apart from each other in a peripheral direction.

The restraining ring 63, provided at the innermost periphery, is supported by the driving ring 62 through the second links 66 and 66, and the driving ring 62 is supported by the securing ring 61 through the first links 65 and 65. The rotation restricting member 60 is integrally formed using, for example, synthetic resin.

In the rotation restricting member 60, a portion of the securing ring 61 is secured to a mounting portion 31c of the outer base 31 of the supporting mechanism 30 forming the fixed section side (refer to FIG. 1).

In addition, the supporting shaft 23 is inserted in the restraining ring 63, and is held by the restraining ring 63 through, for example, an adhesive.

When a rotation occurs at the supporting shaft 23 in a direction around the axis, the restraining ring 63, secured to the supporting shaft 23, also rotates with it. Here, the restraining ring 63 applies rotational forces that rotate the pair of second links 66 and 66, the driving ring 62, the pair of first links 65 and 65, and the securing ring 61 in the direction around the axis.

As mentioned above, the securing ring 61, provided at the outermost periphery, is secured to the mounting portion 31c at the fixed section side. Therefore, when a force in the direction around the axis is generated at the supporting shaft 23, for example, as shown in FIG. 10, a forced twisting deformation occurs at the pair of first links 65 and 65 and the pair of second links 66 and 66. In addition, a restoring force that opposes the deformation at this time acts as a restraining force that prevents rotation in a direction around the axis. Therefore, even if an external force in the direction around the axis is generated, it is possible to essentially prevent the supporting shaft 23 from rolling in the direction around the axis.

The pair of first links 65 and 65 and the pair of second links 66 and 66 have the form of accordions, so that they can expand and contract to a certain extent.

Therefore, as shown in FIG. 9B, when the supporting shaft 23 is tilted, one of the first links 65 and 65 is contracted, and the other of the first links 65 and 65 is expanded. Consequently, the rotation restricting member 60 allows the restraining ring 63 to move along with the supporting shaft 23 in the tilting direction, and does not prevent the supporting shaft 23 from swinging (tilting).

That is, even the rotation restricting member 60 in the third example allows the supporting shaft 23 to tilt, but restricts the rotation of the supporting shaft 23 around the axis.

The rotation restricting member may have the following structure.

Figure 11A:
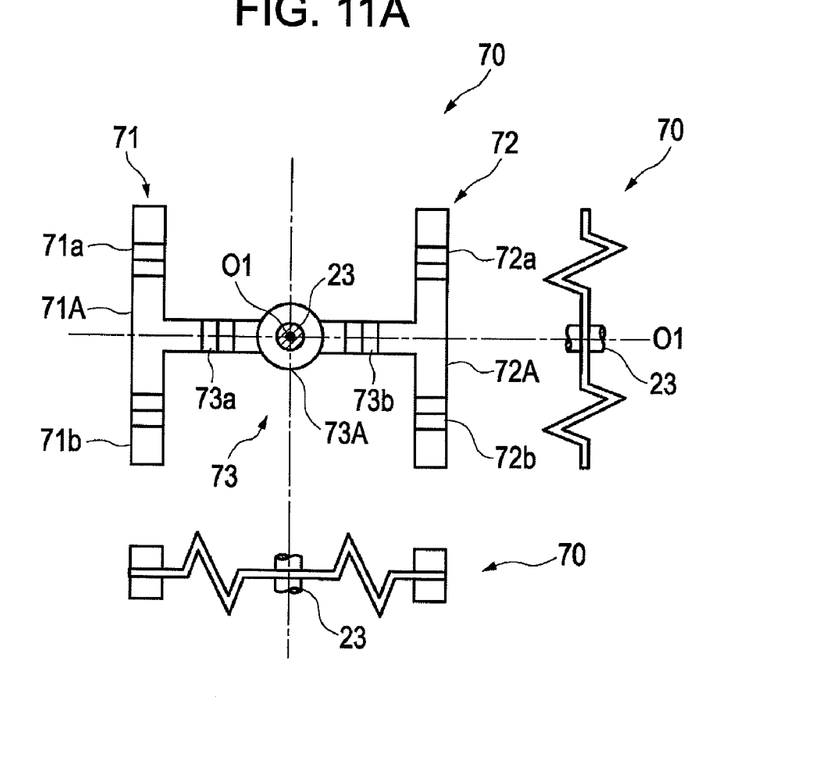
FIG. 11A is a plan view and a side view of a rotation restricting member according to a fourth example, in which the supporting shaft is at a neutral position.
Figure 11B:
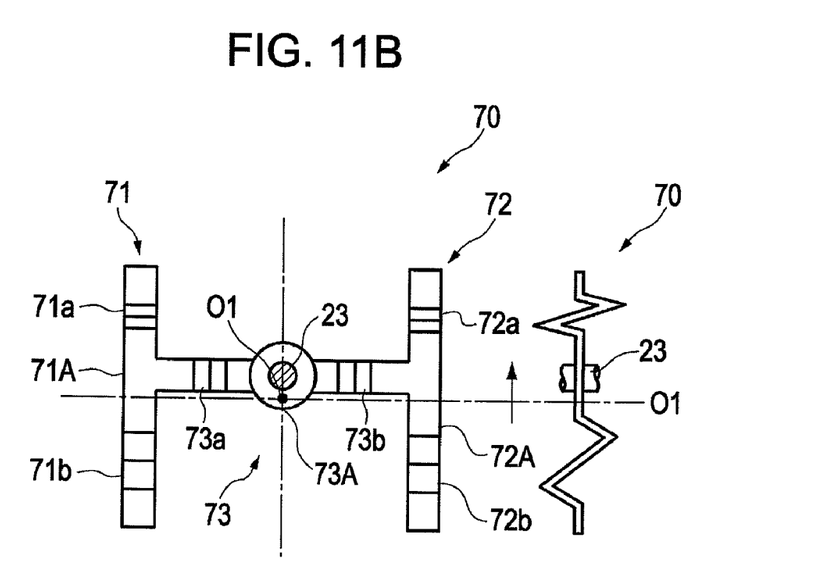
FIG. 11B is a plan view and a side view of the rotation restricting member after the supporting shaft has swung.

FIGS. 11A and 11B are plan views and side views of a rotation restricting member according to a fourth example. FIG. 11A shows a state in which the supporting shaft is at a neutral position. FIG. 11B shows a state in which the supporting shaft has swung.

A rotation restricting member 70 shown in each of FIGS. 11A and 11B has a substantially H shape in plan view, and comprises a pair of deformation members 71 and 72, which extend parallel to each other, and a link 73 that links the deformation members 71 and 72 to each other.

Deformation portions 71a and 71b having the form of accordions are provided at respective ends of the deformation member 71, and deformation portions 72a and 72b having the form of accordions are provided at respective ends of the deformation member 72. A substantially T-shaped non-deformation portion 71A is provided between the deformation portion 71a and the deformation portion 71b, and a substantially T-shaped non-deformation portion 72A is provided between the deformation portion 72a and the deformation portion 72b.

The link 73 is provided between the center of the non-deformation portion 71A and the center of the non-deformation portion 72A. Deformation portions 73a and 73b are also provided at respective ends of the link 73. An end of the deformation portion 73a is linked to the non-deformation portion 71A and an end of the deformation portion 73b is linked to the non-deformation portion 72A.

Both ends of each of the deformation members 71 and 72 are secured to, for example, the mounting portion 31c at the fixed section side as mentioned above. A linking ring 73A is provided between the deformation portions 73a and 73b. The supporting shaft 23 is held at the center of the linking ring 73A.

As shown in FIG. 11B, when, in the rotation restricting member 70, an external force acts upon the supporting shaft 23 in a direction parallel to a first direction along the deformation members 71 and 72, one of the deformation portions 71a and 72a and the deformation portions 71b and 72b are expanded, while the other of the deformation portions 71a and 72a and the deformation portions 71b and 72b are contracted. When an external force acts upon the supporting shaft 23 along a second direction perpendicular to the first direction (that is, along a direction parallel to the link 73), one of the deformation portions 73*a* and 73*b* is contracted, while the other of the deformation portions 73*a* and 73*b* is expanded. Therefore, the rotation restricting member 70 does not prevent the supporting shaft 23 from swinging (tilting).

When a force in a direction around the axis acts upon the supporting shaft 23, an unreasonable force acts upon the deformation portions 71*a* and 71*b* of the deformation member 71, the deformation portions 72*a* and 72*b* of the deformation member 72, and the deformation portions 73*a* and 73*b* of the link 73. Therefore, a reaction force generated at this time acts as a restraining force that prevents rotation of the supporting shaft 23. Consequently, even the rotation restricting member 70 can essentially prevent the supporting shaft 23 from rotating around the axis.

Accordingly, even when the rotation restricting member 70 is used, it is possible to allow tilting of the supporting shaft 23 and to restrict the rotation of the supporting shaft 23 around the axis.

Although, in the embodiment, what is called a moving magnet type (in which the movable section side comprises the magnetic-field generating unit 45 provided with the permanent magnet M, and in which the fixed section side comprises the coil 43) is used, the present invention is not limited thereto. That is, what is called a moving-coil type (in which the coil 43 is provided at the movable section side where the magnetic-field generating unit 45 has been provided and in which the magnetic-field generating unit 45 is provided at the fixed section side where the coil 43 has been provided) may be used.

Although, in the above, a mirror actuator is used as an example of an actuator, the present invention is not limited thereto, so that, obviously, the actuator in the present invention may be applied to various fields. For example, the actuator in the present invention may be used as an antenna actuator that orients a planar antenna in various directions in accordance with the strength of an electrical field.

What is claimed is:

1. An actuator comprising:
   a control object provided at a movable section side;
   a supporting shaft supporting the control object;
   a supporting mechanism provided at a fixed section side, the supporting mechanism swingably supporting the supporting shaft; and
   a driving mechanism swinging the supporting shaft from a neutral position to a position where the supporting shaft is titled,
   wherein the supporting mechanism includes an outer base, an inner ring member, and a plurality of small balls, the outer base having an opening and provided at the fixed section side, the inner ring member provided in the opening of the outer base, the plurality of small balls disposed between an inner side of the opening and an outer side of the inner ring member, the supporting shaft being held by the inner ring member, and
   wherein the driving mechanism includes a magnet, a pair of yokes, and a plurality of driving coils, the magnet provided at either one of the fixed section and the movable section, the yokes disposed at respective poles of the magnet so that the yokes oppose each other, the plurality of driving coils disposed at the other of the fixed section and the movable section, a plurality of arms extending sideways from one of the yokes and movably disposed in the driving coils.

2. The actuator according to claim 1, wherein a clearance allowing movement of the small balls along a direction of a reference axis is provided between the inner ring member and the outer base.

3. The actuator according to claim 1, wherein the inner ring member and the opening in the outer base are both elliptical.

4. The actuator according to claim 1, further comprising a rotation restricting member restricting rotation of the supporting shaft in a direction around an axis, the rotation restricting member provided between the movable section and the fixed section.

5. The actuator according to claim 4, wherein the rotation restricting member includes a plurality of wires laid in a vicinity of the supporting shaft and between the control object and the fixed section.

6. The actuator according to claim 4, wherein the rotation restricting member includes a securing ring, a driving ring, a restraining ring, a first link, and a second link, the securing ring provided at an outermost periphery of the rotation restricting member, the driving ring provided at an inner side of the securing ring, the restraining ring provided at an innermost periphery of the rotation restricting member, the first link linking the securing ring and the driving ring to each other, the second link linking the driving ring and the restraining ring to each other, and
   wherein the securing ring is secured at the fixed section side, and the supporting shaft is held at the center of the restraining ring.

7. The actuator according to claim 6, wherein the first link and second link are each formed in the form of a pair of accordions, and the pair of accordions of the first link are provided 90 degrees from the pair of accordions of the second link.

8. The actuator according to claim 4, wherein the rotation restricting member includes a pair of deformation members, a link, and a linking ring, each deformation member having a deformation portion deformable in a first direction, the link being deformable in a second direction perpendicular to the first direction and linking the pair of deformation members to each other, the linking ring provided at the link, and
   wherein both ends of each of the deformation members are secured at the fixed section side, and the supporting shaft is held at the center of the linking ring.

9. The actuator according to claim 1, wherein the control object is a mirror.

* * * * *